United States Patent
Mathis et al.

[19]

[11] Patent Number: 5,982,967
[45] Date of Patent: Nov. 9, 1999

[54] COLOR-CODED OPTICAL FIBER CABLE AND A METHOD FOR MANUFACTURING THE SAME

[75] Inventors: Terry D. Mathis, Lilburn; John T. Chapin, Alpharetta; Montri Viriyayuthakorn, Norcross, all of Ga.

[73] Assignee: Lucent Technologies Inc., Murray Hill, N.J.

[21] Appl. No.: 08/989,982

[22] Filed: Dec. 12, 1997

[51] Int. Cl.$^6$ .................................................. G02B 6/44
[52] U.S. Cl. .............................................................. 385/102
[58] Field of Search ..................................... 385/100–113

[56] References Cited

U.S. PATENT DOCUMENTS

| | | | |
|---|---|---|---|
| 4,629,285 | 12/1986 | Carter et al. | 385/102 |
| 4,792,203 | 12/1988 | Nelson et al. | 385/135 |
| 5,259,060 | 11/1993 | Edward et al. | 385/128 |
| 5,297,227 | 3/1994 | Brown et al. | 385/56 |
| 5,539,849 | 7/1996 | Petisce | 385/102 |
| 5,666,453 | 9/1997 | Dannenmann | 385/101 |

*Primary Examiner*—Akm E. Ullah

[57] ABSTRACT

The present invention provides a color-coded optical fiber cable and a method for manufacturing the color-coded optical fiber cable. The optical fiber cable of the present invention comprises a glass fiber, a buffer surrounding the fiber, which may be comprised of nylon, an aramid fiber strength member surrounding the fiber buffer, and an outer sheath surrounding the aramid fiber strength member. In accordance with a first embodiment of the present invention, optical fiber cables are color coded by using aramid fiber strength members of different colors. Once a color-coded aramid fiber strength member has been placed about the fiber buffer, it is surrounded by a light-transmissive outer sheath so that the color of the aramid fiber strength member can be easily ascertained, even when the optical fiber cable is wound up on a reel. When employed with a duplex cable, this embodiment allows a technician to easily determine which miniature jumper cable of the duplex cable is the transmit jumper cable and which is the receive jumper cable. In accordance with a second embodiment of the present invention, an optical fiber cable is color coded by placing a colored jacket about the aramid fiber strength member of the optical fiber cable. An outer light-transmissive jacket is then placed about the colored jacket. When a duplex optical fiber cable is color coded in accordance with this embodiment, the colored jackets of each of the jumper cables are simultaneously covered with the light-transmissive outer sheath by extruding the light-transmissive outer sheath over the colored jackets. The light-transmissive outer sheath holds the jumper cables together. The colored jackets of the jumper cables can be easily seen by a technician through the outer light-transmissive jacket of the duplex cable. The present invention can be used in a similar manner to color code optical fiber jumper cables contained in optical fiber quad cables and in optical fiber break-out cables.

45 Claims, 2 Drawing Sheets

COLOR-CODED OPTICAL FIBER CABLE AND A METHOD FOR MANUFACTURING THE SAME

TECHNICAL FIELD OF THE INVENTION

The present invention relates to a color-coded optical fiber cable and, more particularly, to a color-coded optical fiber cable which is color-coded in such a manner that the color code of the optical fiber cable can be ascertained without having to pierce one or more of the outer layers of the optical fiber cable.

BACKGROUND OF THE INVENTION

Optical fiber cables are implemented in communications systems for transmitting information between a laser transmitter and a receiving photodiode. Some optical fiber cables, such as premises cables, are intended to be handled by persons from time to time and, therefore, must be manufactured so that handling of the optical fiber cables will not damage the cables or interfere with signals being transmitted over the cables. Some optical fiber cables manufactured for this purpose are commonly referred to as miniature jumper cables. Each miniature jumper cable commonly is comprised of the fiber itself, which typically is comprised of glass, a fiber buffer surrounding the fiber, which typically is comprised of nylon, an aramid fiber strength member surrounding the fiber buffer, and an outer sheath surrounding the aramid fiber strength member, which typically is comprised of PVC that is opaque.

Duplex optical fiber cables comprise a pair of miniature jumper cables that are attached to each other along the lengths of the jumper cables to form a cable that looks similar to a lamp chord. One of the miniature jumper cables corresponds to the transmit jumper cable and the other miniature jumper cable corresponds to the receive jumper cable. The ends of each of the jumper cables has a connector attached thereto which is used to connect the jumper cables to other devices, such as to an optical transmitter and an optical receiver.

In order to distinguish the transmit jumper cable from the receive jumper cable, manufacturers of duplex cables typically mark one of the jumper cables. For example, it is known to place a stripe of ink along the length of one of the jumper cables of the duplex cable. It is also known to print lettering on one of the jumper cables of the duplex cable, such as the name of the manufacturer of the cable. These markings allow a technician to easily distinguish between the transmit and receive jumper cables. However, placing markings on one of the jumper cables is not an easy task and is prone to error. In fact, one of the greatest wastes of optical fiber cable in the optical fiber cable industry is attributable to cable which is discarded because of inaccurate printing on the cable. Furthermore, when the cables are wound up on reels, as is often the case, the markings are often difficult to see.

Another way to distinguish the transmit jumper cable from the receive jumper cable is to physically remove a portion of the outer sheath of the jumper cable and a portion of the aramid strength member to expose the fiber buffer. It is common in the optical fiber cable industry to use colored buffers. A well known industry standard defines the colors that are used for buffers of different optical fiber cables in order to distinguish between optical fiber cables. The color of the buffer of an optical fiber cable may be determined by looking at the end of the optical fiber cable. However, once a connector has been placed on the end of the optical fiber cable, the buffer is no longer visible.

Therefore, if the cables are not marked in such a manner that the cables can be distinguished, the cables can only be distinguished by removing a portion of the outer sheath and of the aramid strength member so that the color of the buffer is ascertainable. However, in attempting to remove a portion of the sheath and of the aramid strength member, a technician may inadvertently damage the fiber itself Accordingly, a need exists for a method of providing optical fiber cables with a distinguishing characteristic that does not require marking of the cables and that allows the cables to be easily distinguished without piercing the cables. Each of the jumper cables is color coded, either in accordance with one of the color-coding techniques of the present invention or in accordance with a conventional color-coding technique. The color code of each of the jumper cables can easily be ascertained through the outer light-transmissive jacket of the quad cable.

In accordance with a fourth embodiment of the present invention, a six-fiber break-out cable comprising six optical fiber miniature jumper cables has an outer light-transmissive jacket. Each of the jumper cables is color coded, either in accordance with one of the color-coding techniques of the present invention or in accordance with a conventional color-coding technique. The color code of each of the jumper cables can easily be ascertained through the outer light-transmissive jacket of the break-out cable.

Other features and advantages of the present invention will become apparent from the following discussion and claims, as well as from the drawings.

DETAILED DESCRIPTION OF THE INVENTION

Figure 1:
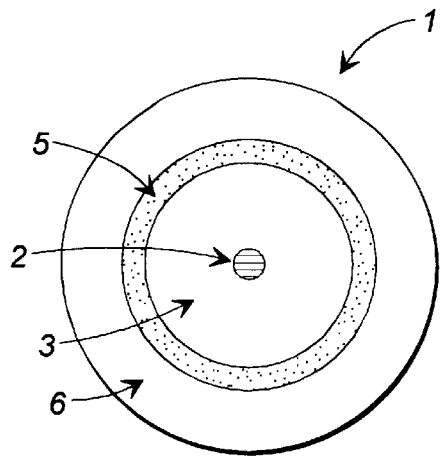
FIG. 1 is an end view of an optical fiber cable color coded in accordance with the first embodiment of the present invention.

FIG. 1 illustrates a first embodiment of the present invention wherein an optical fiber cable 1 is color coded by using an aramid strength member 5 that has a preselected color and by surrounding the aramid strength member 5 with a light-transmissive sheath 6 so that the color of the aramid strength member 5 can be easily ascertained. The optical fiber cable 1 preferably corresponds to a miniature jumper cable. However, it will be apparent to those skilled in the art that the color-coding scheme of the first embodiment of the present invention is not limited to being used only with miniature jumper cables. The color-coding scheme of the first embodiment of the present invention may be used with any optical fiber cable where it is desirable or advantageous to use color coding.

As stated above, aramid strength members that are yellow in color are normally used in optical fiber cables. Also, the outer sheath covering the aramid strength members is normally opaque. Therefore, when two or more optical fiber cables are grouped together to form, for example, a duplex optical fiber cable, in order to distinguish between the optical fiber cables, a technician must either rely on markings on one of the cables or the technician must remove a portion of the outer sheath and a portion of the aramid strength member to determine the color of the fiber buffer, which is normally color coded.

In accordance with the first embodiment of the present invention, the optical fiber cable 1 comprises a glass fiber 2, a fiber buffer 3 surrounding the fiber 2, which may be comprised of nylon, an aramid fiber strength member 5 surrounding the fiber buffer 3, and an outer sheath 6 surrounding the aramid fiber strength member 5, which may be comprised of PVC. The buffer 3 may be comprised of nylon or polyvinydeinelfluoride (PVDF), for example. The aramid fiber strength member 5 has a preselected color such that it provides the color-coding characteristic for the cable 1. The color is selected from a plurality of colors, such as blue and orange, for example. The outer sheath 6 is light-transmissive so that a technician is able to ascertain the color of the aramid fiber strength member 5 through the outer sheath 6. Thus, the technician can determine the color code of the optical fiber cable 1 without having to locate markings on the cable 1 and without having to remove portions of the sheath 6 and of the aramid fiber strength member 5. The outer sheath 6 may be comprised of polyvinylchloride (PVC) or polyvinyldeinefluoride (PVDF), for example.

Figure 2:
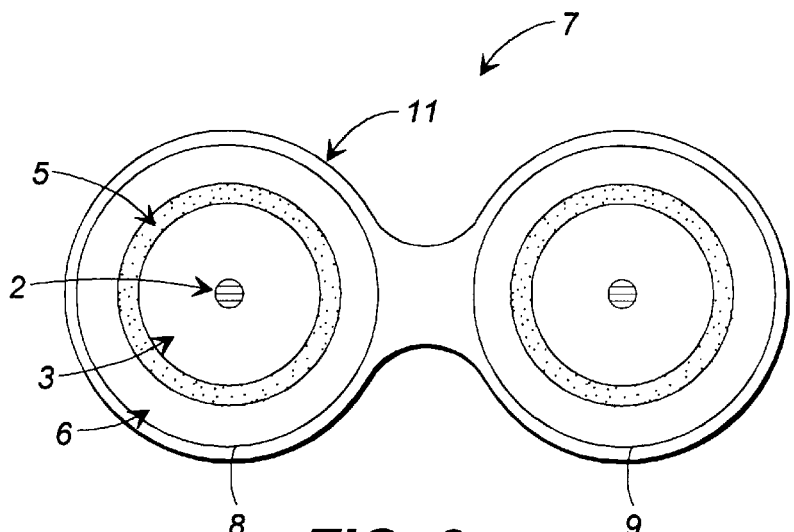
FIG. 2 is an end view of an optical fiber duplex cable comprising two of the optical fiber cables shown in FIG. 1.

As state above, preferably the cable 1 is a miniature jumper cable to be used in a duplex cable, as shown in FIG. 2. Therefore, two miniature jumper cables 8 and 9, each comprising the components shown in FIG. 1 and each having a color-coded aramid fiber strength member 5 and a light-transmissive outer sheath 6, are simultaneously extruded with a thin, light-transmissive polymer layer 11 to form a duplex cable 7. A technician determines which of the miniature jumper cables 8 and 9 of the duplex cable 7 is the transmit cable and which is the receive cable from the colors of the aramid fiber strength members of the miniature jumper cables.

Figure 3:
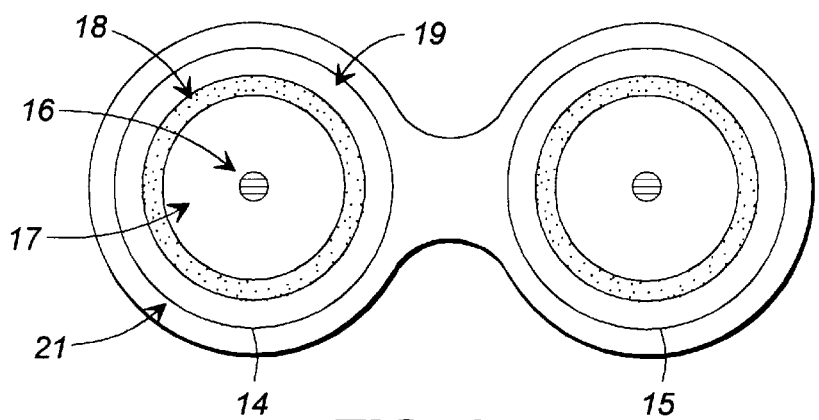
FIG. 3 is an end view of an optical fiber duplex cable comprising two optical fiber cables that are color coded in accordance with the second embodiment of the present invention.

FIG. 3 illustrates a second embodiment of the present invention for color coding an optical fiber cable. In accordance with this embodiment, two miniature optical fiber jumper cables 14 and 15 are color coded by placing colored jackets about the aramid fiber strength members. As in the first embodiment, in accordance with the second embodiment, each of the miniature optical fiber jumper cables 14 and 15 comprises a glass fiber 16, a buffer 17 surrounding the glass fiber 16, an aramid fiber strength member 18 surrounding the buffer 17, and a jacket 19 surrounding the aramid fiber strength member 18.

In accordance with this embodiment, the aramid fiber strength members 18 for each of the cables 14 and 15 maybe the same color. However, the jackets 19 which surround the aramid fiber strength members 18 have preselected colors that are selected from a plurality of colors, such as blue and orange, for example. The jackets 19 are then covered with a light-transmissive outer jacket 21. Since the outer jacket 21 is light-transmissive, a technician can easily ascertain the color of jacket 19 without having to remove a portion of the outerjacket 21.

Preferably the outer jacket 21 is extruded over the jackets 19 of both of the cables 14 and 15 simultaneously such that a single outer jacket 21 covers the jackets 19 of both of the cables 14 and 15. However, it will be apparent to those skilled in the art that the color coding scheme of the second embodiment can be used with individual optical fiber cables that are not arranged in a duplex cable. In this case, a single optical fiber cable having all of the components of either of cables 14 or 15 discussed above is covered with an outer light-transmissive jacket so that the color of the colored jacket 19 can be easily ascertained through the light-transmissive outer jacket. The jackets 19 and 21 may be comprised of PVC or PVDF, for example. The buffer 17 may be comprised of PVFD or nylon.

Figure 4:
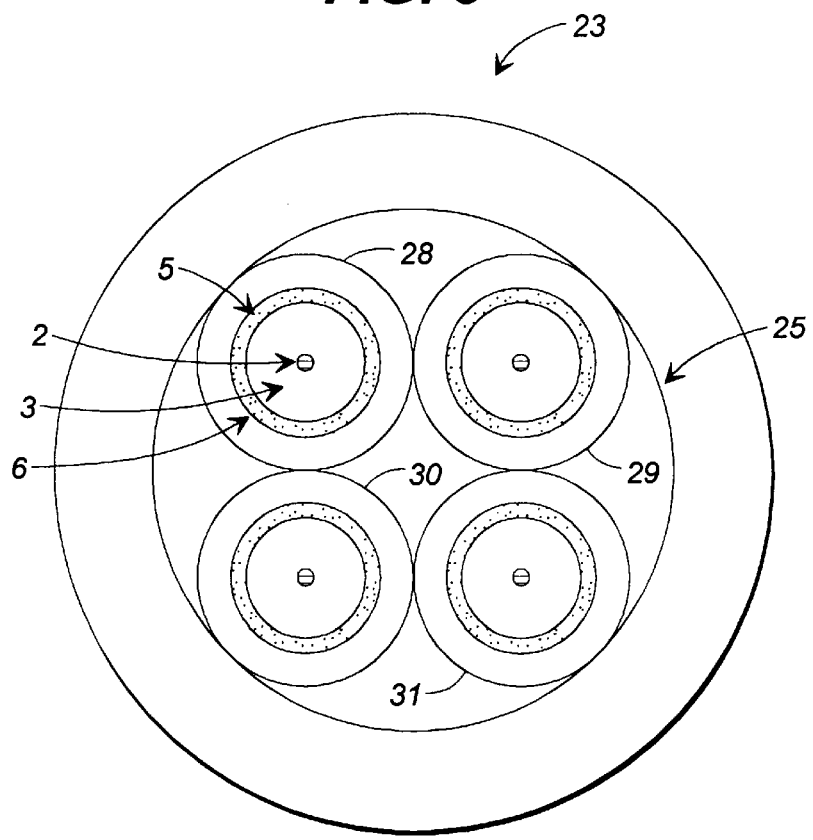
FIG. 4 is an end view of a quad cable comprising four optical fiber cables that are color coded and which are surrounded by a light-transmissive outer jacket.

FIG. 4 illustrates a third embodiment of the present invention wherein an optical fiber quad cable 23 comprising four color-coded optical fiber cables 28–31 comprises a light-transmissive outer jacket that surrounds the optical fiber cables 28–31. Typical optical fiber quad cables contain four optical fiber miniature jumper cables, each of which has a colored jacket that functions as the color code for the respective jumper cable. Typically, the quad cable has an opaque outer jacket which envelopes all of the miniature jumper cables. Therefore, with typical quad cables, a technician must remove a portion of the opaque outer jacket to ascertain the colors of the jumper cables.

In accordance with the third embodiment of the present invention, the outerjacket 25 of the quad cable 23 is light-transmissive, thus enabling a technician to ascertain the colors of each of the jumper cables 28–31 without having to pierce the outer jacket 25 of the quad cable 23. In accordance with this embodiment, the four optical fiber cables 28–31 contained in the outer jacket 25 of the quad cable 23 are color coded, either by using one of the color-coding techniques of the present invention discussed above or by using a conventional color-coding technique. Since the outer jacket 25 of the quad cable 23 is light-transmissive, a technician can determine the color codes of each of the cables 28–31 without having to pierce the outer jacket 25. This is particularly advantageous when using mid-span entry. In order to perform mid-span entry, a technician pierces the outer jacket 25 in order to obtain access to one or more of the cables 28–31 for some purpose, such as to connect it to a transmitter or receiver.

Figure 5:
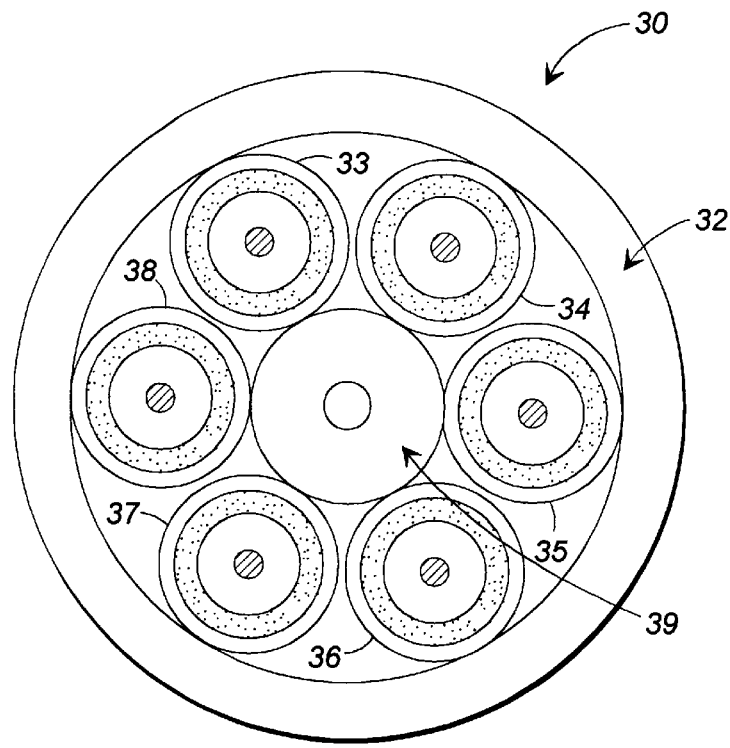
FIG. 5 is an end view of a six-fiber break-out cable comprising six optical fiber cables that are color coded and which are surrounded by a light-transmissive outer jacket.

FIG. 5 illustrates a fourth embodiment of the present invention wherein an optical fiber break-out cable 30 comprising six color-coded optical fiber cables 33–38 comprises a light-transmissive outer jacket 32 that surrounds the optical fiber cables 33–38. The break-out cable 30 comprises a support member 39 that provides mechanical support for the break-out cable 30. In accordance with this embodiment, the six optical fiber cables 33–38 contained in the outerjacket 32 of the break-out cable 30 are color coded, either by using one of the color-coding techniques of the present invention discussed above or by using a conventional color-coding technique. Since the outer jacket 32 of the break-out cable 30 is light-transmissive, a technician can determine the color codes of each of the cables 33–38 without having to pierce the outerjacket 32. As with the third embodiment discussed above, this embodiment is also advantageous when using mid-span entry, as will be understood by those skilled in the art.

Outside optical fiber cables, commonly referred to as loose-tube cables, contain a plurality of unbuffered glass fibers. The fibers are unbuffered because, once the outside optical fiber cable has been installed and the fibers have been connected, they typically are never handled again. Therefore, there is no need to cover the glass fiber with a buffer. The glass fibers used in loose-tube cables are color coded by covering the fibers with ink.

In contrast, inside optical fiber cables, commonly referred to as tight-buffered cables, are normally color coded by surrounding the glass fiber with a colored buffer, as discussed above. Ink is not placed on the glass fiber itself.

Fiber identifiers are used to detect whether or not a signal is being transmitted over a particular optical fiber. The fiber identifier is placed adjacent the glass fiber and the fiber is bent a sufficient amount to cause light to exit the fiber and impinge on the fiber identifier, without damaging the fiber. The fiber identifier contains a photodetector that detects the light exiting the fiber. When using a fiber identifier to detect a signal being transmitted over a fiber of a tight-buffered cable, a portion of the colored buffer must be removed.

In accordance with the present invention, it has been determined that the buffer 3 or 17 of an optical fiber cable such as that shown in FIGS. 1, 2 and 3 can be comprised of a light-transmissive material so that a fiber identifier can be used to detect a signal being transmitted on the fiber without having to remove a portion of the buffer. Another advantage of using a light-transmissive buffer is that doing so would allow inked glass fibers to be used in inside cables as well as in outside cables, with the ink acting as the color code for the respective optical fiber. Therefore, rather than using a colored buffer to provide a color code for the optical fiber, the color of the inked fiber may be used. Furthermore, the light-transmissive buffer provides a stronger marked loss signal for the fiber identifier to detect.

It will be apparent to those skilled in the art that, although the present invention has been described with respect to certain embodiments, the present invention is not limited to these embodiments. It will be understood by those skilled in the art that modifications may be made to the embodiments discussed above that are within the spirit and scope of the present invention.

What is claimed is:

1. An optical fiber cable comprising:
   an optical fiber capable of propagating light;
   a buffer coating surrounding the optical fiber, the buffer coating having an inner surface and an outer surface, the inner surface of the buffer coating being adjacent an outer surface of the optical fiber;
   a strength member surrounding the buffer coating, the strength member having an inner surface and an outer surface, the inner surface of the strength member being adjacent the outer surface of the buffer coating, the strength member having a color, the color of the strength member being selected from a plurality of colors, the color of the strength member functioning as a distinguishing characteristic of the optical fiber cable; and
   an outer jacket surrounding the strength member, the outer jacket having an inner surface and an outer surface, the inner surface of the outer jacket being adjacent the outer surface of the strength member, the outer jacket being transmissive to light such that the color of the strength member can be ascertained by a person who is viewing the optical fiber cable from the outer surface of the outer jacket.

2. The optical fiber cable of claim 1, wherein the strength member is an aramid fiber strength member.

3. The optical fiber cable of claim 1, wherein the optical fiber cable is a miniature jumper cable.

4. The optical fiber cable of claim 1, wherein the outer jacket is transparent.

5. The optical fiber cable of claim 1, wherein the buffer coating is comprised of a light-transmissive material.

6. An optical fiber duplex cable comprising a first optical fiber jumper cable and a second optical fiber jumper cable, the first and second optical fiber jumper cables being held together by an outer sheath that is transmissive to light, each of the first and second optical fiber jumper cables comprising:
   an optical fiber capable of propagating light;
   a buffer coating surrounding the optical fiber, the buffer coating having an inner surface and an outer surface, the inner surface of the buffer coating being adjacent an outer surface of the optical fiber;
   a strength member surrounding the buffer coating, the strength member having an inner surface and an outer surface, the inner surface of the strength member being adjacent the outer surface of the buffer coating, the strength member having a color, the color of the strength member being selected from a plurality of colors, the color of the strength member functioning as a distinguishing characteristic of the optical fiber jumper cable; and
   an outer jacket surrounding the strength member, the outer jacket having an inner surface and an outer surface, the inner surface of the outer jacket being adjacent the outer surface of the strength member, the outer jacket being transmissive to light such that the color of the strength member can be ascertained by a person who is viewing the optical fiber duplex cable from an outer surface of the outer sheath of the optical fiber duplex cable.

7. The optical fiber duplex cable of claim 6, wherein the strength members of the first and second optical fiber jumper cables are of different colors such that a person viewing the optical fiber duplex cable from the outer surface of the outer sheath can distinguish the first optical fiber jumper cable from the second optical fiber jumper cable based on the different colors of the strength members of the first and second optical fiber jumper cables.

8. The optical fiber duplex cable of claim 7, wherein the strength members of the first and second optical fiber jumper cables are aramid fiber strength members.

9. The optical fiber duplex cable of claim 7, wherein the outer jackets of the first and second optical fiber jumper cables are transparent.

10. An optical fiber quad cable comprising a first optical fiber jumper cable, a second optical fiber jumper cable, a third optical fiber jumper cable, and a fourth optical fiber jumper cable, the optical fiber jumper cables being held together by an outer sheath that is transmissive to light, each of the optical fiber jumper cables comprising:
    an optical fiber capable of propagating light;
    a buffer coating surrounding the optical fiber, the buffer coating having an inner surface and an outer surface, the inner surface of the buffer coating being adjacent an outer surface of the optical fiber;
    a strength member surrounding the buffer coating, the strength member having an inner surface and an outer surface, the inner surface of the strength member being adjacent the outer surface of the buffer coating, the strength member having a color, the color of the strength member being selected from a plurality of colors, the color of the strength member functioning as a distinguishing characteristic of the optical fiber jumper cable; and
    an outer jacket surrounding the strength member, the outer jacket having an inner surface and an outer surface, the inner surface of the outer jacket being adjacent the outer surface of the strength member, the outer jacket being transmissive to light such that the color of the strength member can be ascertained by a person who is viewing the optical fiber jumper cable from an outer surface of the outer sheath.

11. The optical fiber quad cable of claim 10, wherein the strength members of the optical fiber jumper cables are of different colors such that a person viewing the optical fiber quad cable from the outer surface of the outer sheath can distinguish the optical fiber jumper cables from one another based on the different colors of the strength members of the optical fiber jumper cables.

12. The optical fiber quad cable of claim 11, wherein the strength members of the optical fiber jumper cables are aramid fiber strength members.

13. The optical fiber quad cable of claim 12, wherein the outer jackets of the optical fiber jumper cables are transparent.

14. An optical fiber break-out cable comprising a first optical fiber jumper cable, a second optical fiber jumper cable, a third optical fiber jumper cable, a fourth optical fiber jumper cable, fifth optical fiber jumper cable, and a sixth optical fiber jumper cable, the optical fiber jumper cables being held together by an outer sheath that is transmissive to light, each of the optical fiber jumper cables comprising:
   an optical fiber capable of propagating light;
   a buffer coating surrounding the optical fiber, the buffer coating having an inner surface and an outer surface, the inner surface of the buffer coating being adjacent an outer surface of the optical fiber;
   a strength member surrounding the buffer coating, the strength member having an inner surface and an outer surface, the inner surface of the strength member being adjacent the outer surface of the buffer coating, the strength member having a color, the color of the strength member being selected from a plurality of colors, the color of the strength member functioning as a disingushing characteristic of the optical fiber jumper cable; and
   an outer jacket surrounding the strength member, the outer jacket having an inner surface and an outer surface, the inner surface of the outer jacket being adjacent the outer surface of the strength member, the outer jacket being transmissive to light such that the color of the strength member can be ascertained by a person who is viewing the optical fiber break-out cable from an outer surface of the outer sheath of the optical fiber break-out cable.

15. The optical fiber break-out cable of claim 14, wherein the strength members of the optical fiber jumper cables are of different colors such that a person viewing the optical fiber break-out cable from the outer surface of the outer sheath can distinguish the optical fiber jumper cables from one another based on the different colors of the strength members of the optical fiber jumper cables.

16. The optical fiber break-out cable of claim 15, wherein the strength members of the optical fiber jumper cables are aramid fiber strength members.

17. The optical fiber quad cable of claim 16, wherein the outerjackets of the optical fiber jumper cables are transparent.

18. An optical fiber cable comprising:
   an optical fiber capable of propagating light;
   a buffer coating surrounding the optical fiber, the buffer coating having an inner surface and an outer surface, the inner surface of the buffer coating being adjacent an outer surface of the optical fiber;
   a strength member surrounding the buffer coating, the strength member having an inner surface and an outer surface, the inner surface of the strength member being adjacent the outer surface of the buffer coating; and
   an outer jacket surrounding the strength member, the outer jacket having an inner surface and an outer surface, the inner surface of the outer jacket being adjacent the outer surface of the strength member, the outer jacket having a color selected from a plurality of colors, the color of the outer jacket functioning as a distinguishing characteristic of the optical fiber cable, wherein the color of the outer jacket can be ascertained by a person who is viewing the optical fiber cable from the outer surface of the outer jacket.

19. The optical fiber cable of claim 18, wherein the strength member is an aramid fiber strength member.

20. The optical fiber cable of claim 18, wherein the optical fiber cable is a miniature jumper cable comprised in an optical fiber duplex cable.

21. An optical fiber duplex cable comprising a first optical fiber jumper cable and a second optical fiber jumper cable, the first and second optical fiber jumper cables being held together by an outer sheath that is transmissive to light, each of the first and second optical fiber jumper cables comprising:
   an optical fiber capable of propagating light;
   a buffer coating surrounding the optical fiber, the buffer coating having an inner surface and an outer surface, the inner surface of the buffer coating being adjacent an outer surface of the optical fiber;
   a strength member surrounding the buffer coating, the strength member having an inner surface and an outer surface, the inner surface of the strength member being adjacent the outer surface of the buffer coating; and
   an outer jacket surrounding the strength member, the outer jacket having an inner surface and an outer surface, the inner surface of the outer jacket being adjacent the outer surface of the strength member, the outer jacket having a color selected from a plurality of colors, the color of the outer jacket functioning as a distinguishing characteristic of the optical fiber jumper cable, wherein the color of the outer jacket can be ascertained by a person who is viewing the optical fiber duplex cable from an outer surface of the outer sheath of the optical fiber duplex cable.

22. The optical fiber duplex cable of claim 21, wherein the outer jackets of the first and second optical fiber jumper cables are of different colors such that a person viewing the optical fiber duplex cable from the outer surface of the outer sheath can distinguish the first optical fiber jumper cable from the second optical fiber jumper cable based on the different colors of the outer jackets of the first and second optical fiber jumper cables.

23. The optical fiber duplex cable of claim 22, wherein the strength members of the first and second optical fiber jumper cables are aramid fiber strength members.

24. An optical fiber quad cable comprising a first optical fiber jumper cable, a second optical fiber jumper cable, a third optical fiber jumper cable, and a fourth optical fiber jumper cable, the optical fiber jumper cables being held together by an outer sheath that is transmissive to light, each of the optical fiber jumper cables comprising:
   an optical fiber capable of propagating light;
   a buffer coating surrounding the optical fiber, the buffer coating having an inner surface and an outer surface, the inner surface of the buffer coating being adjacent an outer surface of the optical fiber;
   a strength member surrounding the buffer coating, the strength member having an inner surface and an outer surface, the inner surface of the strength member being adjacent the outer surface of the buffer coating; and an outer jacket surrounding the strength member, the outer jacket having an inner surface and an outer surface, the inner surface of the outer jacket being adjacent the outer surface of the strength member, the outer jacket having a color selected from a plurality of colors, the color of the outer jacket functioning as a distinguishing characteristic of the optical fiber jumper cable, wherein the color of the outer jacket can be ascertained by a person who is viewing the optical fiber quad cable from an outer surface of the outer sheath of the optical fiber quad cable.

25. The optical fiber quad cable of claim 24, wherein the outerjackets of the optical fiber jumper cables are of different colors such that a person viewing the optical fiber quad cable from the outer surface of the outer sheath can distinguish the optical fiber jumper cables from one another based on the different colors of the outer jackets of the optical fiber jumper cables.

26. The optical fiber quad cable of claim 25, wherein the strength members of the optical fiber jumper cables are aramid fiber strength members.

27. The optical fiber quad cable of claim 26, wherein the outer sheath of the optical fiber quad cable is transparent.

28. An optical fiber break-out cable comprising a first optical fiber jumper cable, a second optical fiber jumper cable, a third optical fiber jumper cable, a fourth optical fiber jumper cable, fifth optical fiber jumper cable, and a sixth optical fiber jumper cable, the optical fiber jumper cables being held together by an outer sheath that is transmissive to light, each of the optical fiber jumper cables comprising:

an optical fiber capable of propagating light;

a buffer coating surrounding the optical fiber, the buffer coating having an inner surface and an outer surface, the inner surface of the buffer coating being adjacent an outer surface of the optical fiber;

a strength member surrounding the buffer coating, the strength member having an inner surface and an outer surface, the inner surface of the strength member being adjacent the outer surface of the buffer coating, the strength member being opaque to light; and an outer jacket surrounding the strength member, the outer jacket having an inner surface and an outer surface, the inner surface of the outer jacket being adjacent the outer surface of the strength member, the outer jacket having a color selected from a plurality of colors, the color of the outerjacket functioning as a distinguishing characteristic of the optical fiber jumper cable, wherein the color of the outer jacket can be ascertained by a person who is viewing the optical fiber break-out cable from an outer surface of the outer sheath of the optical fiber break-out cable.

29. The optical fiber break-out cable of claim 28, wherein the outer jackets of the optical fiber jumper cables are of different colors such that a person viewing the optical fiber break-out cable from the outer surface of the outer sheath can distinguish the optical fiber jumper cables from one another based on the different colors of the outer jackets of the optical fiber jumper cables.

30. The optical fiber break-out cable of claim 29, wherein the strength members of the optical fiber jumper cables are aramid fiber strength members.

31. The optical fiber break-out cable of claim 30, wherein the outer sheath of the optical fiber break-out cable is transparent.

32. A method for manufacturing a color-coded optical fiber cable comprising the steps of:

surrounding an optical fiber with a buffer coating, the buffer coating having an inner surface and an outer surface, the inner surface of the buffer coating being adjacent an outer surface of the optical fiber;

surrounding the buffer coating with a strength member, the strength member having an inner surface and an outer surface, the inner surface of the strength member being adjacent the outer surface of the buffer coating, the strength member having a color, the color of the strength member being selected from a plurality of colors, the color of the strength member functioning as a distinguishing characteristic of the optical fiber cable; and surrounding the strength member with an outer jacket, the outer jacket having an inner surface and an outer surface, the inner surface of the outer jacket being adjacent the outer surface of the strength member, the outer jacket being transmissive to light such that the color of the strength member can be ascertained by a person who is viewing the optical fiber cable from the outer surface of the outer jacket.

33. The method of claim 32, wherein the strength member is an aramid fiber strength member.

34. The method of claim 33, wherein the optical fiber cable is a miniature jumper cable.

35. The method of claim 34, wherein the outer jacket is transparent.

36. A method for manufacturing an optical fiber duplex cable, the duplex cable comprising a first optical fiber jumper cable and a second optical fiber jumper cable, the method comprising the steps of:

surrounding a first optical fiber with a first buffer coating, the first buffer coating having an inner surface and an outer surface, the inner surface of the first buffer coating being adjacent an outer surface of the first optical fiber;

surrounding a second optical fiber with a second buffer coating, the second buffer coating having an inner surface and an outer surface, the inner surface of the second buffer coating being adjacent an outer surface of the second optical fiber;

surrounding the first buffer coating with a first strength member, the first strength member having an inner surface and an outer surface, the inner surface of the first strength member being adjacent the outer surface of the first buffer coating, the first strength member having a color, the color of the first strength member being selected from a plurality of colors, the color of the first strength member functioning as a distinguishing characteristic of the first optical fiber jumper cable;

surrounding the second buffer coating with a second strength member, the second strength member having an inner surface and an outer surface, the inner surface of the second strength member being adjacent the outer surface of the second buffer coating, the second strength member having a color, the color of the second strength member being selected from a plurality of colors, the color of the second strength member functioning as a distinguishing characteristic of the second optical fiber jumper cable; and surrounding the strength members with an outer sheath, the outer sheath having an inner surface and an outer surface, the inner surface of the outer sheath being adjacent the outer surfaces of the strength members, the outer sheath being transmissive to light such that the colors of the strength members can be ascertained by a person who is viewing the optical fiber duplex cable from an outer surface of the outer sheath of the optical fiber duplex cable.

37. The method of claim 36, wherein the strength members of the first and second optical fiber jumper cables are of different colors such that a person viewing the optical fiber duplex cable from the outer surface of the outer sheath can distinguish the first optical fiber jumper cable from the second optical fiber jumper cable based on the different colors of the strength members of the first and second optical fiber jumper cables.

38. The method of claim 37, wherein the strength members of the first and second optical fiber jumper cables are aramid fiber strength members.

39. The method of claim 38, wherein the outer sheath is transparent.

40. A method for manufacturing an optical fiber cable comprising the steps of:

surrounding an optical fiber with a buffer coating, the buffer coating having an inner surface and an outer surface, the inner surface of the buffer coating being adjacent an outer surface of the optical fiber;

surrounding the buffer coating with a strength member, the strength member having an inner surface and an outer surface, the inner surface of the strength member being adjacent the outer surface of the buffer coating, the strength member being opaque to light; and surrounding the strength member with an outer jacket, the outer jacket having an inner surface and an outer surface, the inner surface of the outer jacket being adjacent the outer surface of the strength member, the outer jacket having a color selected from a plurality of colors, the color of the outer jacket functioning as a distinguishing characteristic of the optical fiber cable, wherein the color of the outer jacket can be ascertained by a person who is viewing the optical fiber cable from the outer surface of the outer jacket.

41. The method of claim 40, wherein the strength member is an aramid fiber strength member, the aramid fiber strength member being opaque in color.

42. The method of claim 41, wherein the optical fiber cable is a miniature jumper cable comprised in an optical fiber duplex cable.

43. A method for manufacturing an optical fiber duplex cable comprising a first optical fiber jumper cable and a second optical fiber jumper cable, the method comprising the steps of:

surrounding a first optical fiber with a first buffer coating, the buffer coating having an inner surface and an outer surface, the inner surface of the buffer coating being adjacent an outer surface of the optical fiber;

surrounding a second optical fiber with a second buffer coating, the second buffer coating having an inner surface and an outer surface, the inner surface of the second buffer coating being adjacent an outer surface of the first optical fiber;

surrounding the first buffer coating with a first strength member, the first strength member having an inner surface and an outer surface, the inner surface of the first strength member being adjacent the outer surface of the first buffer coating, the first strength member being opaque to light;

surrounding the second buffer coating with a second strength member, the second strength member having an inner surface and an outer surface, the inner surface of the second strength member being adjacent the outer surface of the second buffer coating, the second strength member being opaque to light;

surrounding the first strength member with a first outer jacket, the first outer jacket having an inner surface and an outer surface, the inner surface of the first outer jacket being adjacent the outer surface of the first strength member, the first outer jacket having a color selected from a plurality of colors, the color of the first outer jacket functioning as a distinguishing characteristic of the first optical fiber jumper cable, wherein the color of the first outer jacket can be ascertained by a person who is viewing the optical fiber duplex cable from an outer surface of the optical fiber duplex cable;

surrounding the second strength member with a second outer jacket, the second outer jacket having an inner surface and an outer surface, the inner surface of the second outer jacket being adjacent the outer surface of the second strength member, the second outer jacket having a color selected from a plurality of colors, the color of the second outer jacket functioning as a distinguishing characteristic of the second optical fiber jumper cable, wherein the color of the second outer jacket can be ascertained by a person who is viewing the optical fiber duplex cable from an outer surface of the optical fiber duplex cable; and surrounding the first and second outer jackets with an outer sheath that is transmissive to light.

44. The method of claim 43, wherein the outer jackets of the first and second optical fiber jumper cables are of different colors such that a person viewing the optical fiber duplex cable from the outer surface of the duplex cable can distinguish the first optical fiber jumper cable from the second optical fiber jumper cable based on the different colors of the outer jackets of the first and second optical fiber jumper cables.

45. The method of claim 44, wherein the strength members of the first and second optical fiber jumper cables are aramid fiber strength members that are opaque to light.

* * * * *